United States Patent
Katagiri et al.

(10) Patent No.: US 7,936,749 B2
(45) Date of Patent: May 3, 2011

(54) NODE DEVICE FOR TRANSFERING SUPERVISORY CONTROL INFORMATION IN PHOTONIC NETWORK

(75) Inventors: Toru Katagiri, Kawasaki (JP); Takao Naito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 891 days.

(21) Appl. No.: 11/258,000

(22) Filed: Oct. 26, 2005

(65) Prior Publication Data

US 2006/0209854 A1   Sep. 21, 2006

(30) Foreign Application Priority Data

Mar. 18, 2005   (JP) .................................. 2005-080324

(51) Int. Cl.
 H04L 12/50   (2006.01)
 H04B 10/08  (2006.01)
 H04J 14/02   (2006.01)
(52) U.S. Cl. .......... 370/373; 370/377; 370/384; 398/31; 398/32; 398/33; 398/37; 398/94
(58) Field of Classification Search .......... 370/369–385; 398/30–33, 37, 38, 94
See application file for complete search history.

(56) References Cited

U.S. PATENT DOCUMENTS

| | | | | |
|---|---|---|---|---|
| 7,027,210 B2* | 4/2006 | Tian et al. | ...................... | 359/333 |
| 2002/0024723 A1* | 2/2002 | Sekiya et al. | ............... | 359/337.1 |
| 2002/0105960 A1* | 8/2002 | Das et al. | ....................... | 370/442 |
| 2003/0035171 A1* | 2/2003 | Touma | ........................... | 359/124 |
| 2004/0022252 A1* | 2/2004 | Jang et al. | ................. | 370/395.52 |
| 2005/0254504 A1* | 11/2005 | Ozu | .............................. | 370/401 |
| 2006/0209854 A1* | 9/2006 | Katagiri et al. | ............... | 370/401 |

FOREIGN PATENT DOCUMENTS

| | | |
|---|---|---|
| JP | 05-292083 A | 11/1993 |
| JP | 9-247106 | 9/1997 |
| JP | 2000-165357 | 6/2000 |
| JP | 2001-230732 A | 8/2001 |
| JP | 2001230732 A * | 8/2001 |

OTHER PUBLICATIONS

JPO, Office Action mailed by the Japan Patent Office on Mar. 23, 2010, in connection with foreign counterpart application No. JP 2005-080324.

* cited by examiner

*Primary Examiner* — Daniel J Ryman
*Assistant Examiner* — Thinh D Tran
(74) *Attorney, Agent, or Firm* — Fujitsu Patent Center

(57) ABSTRACT

A node device receives supervisory control information on a dedicated wavelength different from a wavelength of signal light, which is input from an input port together with the signal light, and extracts, from signal light to be output from an output port, information superposed on an optical main signal of the signal light. Then, it is confirmed whether or not the signal light to be output and the supervisory control information correspond by using the extracted information, and supervisory control information corresponding to the signal light to be output is transmitted on the dedicated wavelength from the output port.

2 Claims, 14 Drawing Sheets

| | DEDICATED WAVELENGTH METHOD | MAIN SIGNAL SUPER-POSITION METHOD | PRESENT INVENTION |
|---|---|---|---|
| CORRESPONDENCE WITH OPTICAL MAIN SIGNAL | × 1:n (n: NUMBER OF WAVELENGTHS) | ○ 1:1 | ○ 1:1 |
| BIT-RATE OF SUPERVISORY CONTROL INFROMATION | ○ HIGH | × LOW | ○ HIGH |
| UPDATE OF SUPERVISORY CONTROL INFORMATION IN MIDDLE OF ROUTE OF OPTICAL PATH | ○ EACH NODE | × DIFFICULT | ○ EACH NODE |
| NODE CAPABLE OF RECEIVING SUPERVISORY CONTROL INFORMATION | ○ EACH NODE | ○ EACH NODE | ○ EACH NODE |

FIG. 12

NODE DEVICE FOR TRANSFERING SUPERVISORY CONTROL INFORMATION IN PHOTONIC NETWORK

BACKGROUND OF THE INVENTION

1. Field of the Invention

The present invention relates to a node device for transferring supervisory control information in a photonic network having various network topology configurations such as ring interconnection, mesh connection or the like for accommodating and transmitting signals for various services.

2. Description of the Related Art

Conventionally, a network topology configuration in the photonic network system has employed a point-to-point configuration. However in recent years, the construction of the photonic network systems employing the ring topology and the mesh topology are studied in which the OADM (Optical Add/Drop Multiplexing) node and the HUB node for realizing the path switching of the signal as the light without the photoelectric conversion are used.

Also, the OTN (Optical Transport Network), the Ethernet (registered trademark), the FC (Fiber Channel) and the like have been added to the types of the signals to be transmitted in the photonic network in addition to the SONET (Synchronous Optical Network)/SDH (Synchronous Digital Hierarchy) which have been transmitted in the photonic network conventionally. Accordingly, the variety of the types of the signals to be transmitted in the photonic network has become wider.

The photonic network consists of an optical transmission/reception terminal station, an optical HUB node device, and an optical amplification relay device for the WDM (Wavelength Division Multiplexing) signals, and optical fibers which are the transmission lines for connecting the above node devices, for example.

Each node device comprises an EMS (Equipment Management System) for operating and managing the devices, and each EMS is connected to a NMS (Network Management System) for integrating and managing the photonic network. The supervisory control information transferred to each node device is managed by the NMS or the EMS.

Also, in the photonic network, the optical path switch control is conducted in the unit of the wavelength path in which the optical wavelength of each signal is used as the unit for the path. In each wavelength path, the information is transmitted, for example, in the format of the SONET, the SDH, the OTN, the Ethernet (registered trademark), the FC or the like.

As the method for transferring the supervisory control information for each wavelength path, there are two major methods as below (see Patent Document 1 below for example).

Patent Document 1
 Japanese Patent Application Publication No. 09-247106

(1) Dedicated Wavelength Method

Dedicated wavelength which is out of signal wavelength band of WDM signal is assigned for supervisory control, and each node device transfers supervisory control information while providing electrical termination of the supervisory control information. This dedicated wavelength is referred to as OSC (Optical Supervisory Channel) and used for transferring supervisory control information of the WDM signal by n channel multiplexing.

(2) Main Signal Superposition Method

In an optical transmission terminal station of each wavelength path, supervisory control information with the bit rate sufficiently lower than the bit rate of optical main signal is modulated by subcarrier, and then, the supervisory control information is transferred being superposed on the optical main signal.

FIG. 1A shows an example of a photonic network in accordance with the above dedicated wavelength method. This network consists of transmission terminal stations 11-1 and 11-2, a HUB node device 12 and reception terminal stations 13-1 and 13-2.

The transmission terminal station 11-1 comprises an EMS 21-1 and a transmitter (OSC-S) 22-1, and the transmission terminal station 11-2 comprises an EMS 21-2 and a transmitter (OSC-S) 22-2. A reception terminal station 13-1 comprises an EMS 21-4 and a receiver (OSC-R) 23-3, and a reception terminal station 13-2 comprises an EMS 21-5 and a receiver (OSC-R) 23-4.

Also, the HUB node device 12 comprises an EMS 21-3, receivers (OSC-R) 23-1 and 23-2, transmitters (OSC-S) 22-3 and 22-4, and an optical path switch 24. The OSC-S and the OSC-R are the transmitter and the receiver for the supervisory control information in accordance with the dedicated wavelength method, respectively. The supervisory control signals are generated/terminated in respective node devices.

Signal light 31 in a wavelength path A sent from the transmission terminal station 11-1 and signal light 32 in a wavelength path B sent from the transmission terminal station 11-2 are transmitted to the reception terminal station 13-2 via the optical path switch 24 of the HUB node device 12.

Upon this, the EMS 21-1 generates supervisory control information 33 for the wavelength path A on the OSC, transfers the generated information to the EMS 21-3 via the transmitter 22-1 and the receiver 23-1. The EMS 21-2 generates supervisory control information 34 for the wavelength path B on the OSC and transfers the generated information to the EMS 21-3 via the transmitter 22-2 and the receiver 23-2. The EMS 21-3 transfers the received supervisory control information 33 and 34 to the EMS 21-5 via the transmitter 22-4 and the receiver 23-4.

As described above, in the dedicated wavelength method, the path switching for the supervisory control information is conducted similarly to that for the optical main signal in the HUB node device 12.

FIG. 1B shows an example of a photonic network in accordance with the above described main signal superposition method. This network consists of transmission terminal stations 51-1 and 51-2, a HUB node device 52, and reception terminal stations 53-1and 53-2.

The transmission terminal station 51-1 comprises an EMS 61-1, a receiver (SC-Ro) 63-1 and a plurality of transmitters (SCM), and the transmission terminal station 51-2 comprises an EMS 61-2, a receiver (SC-Ro) 63-2 and a plurality of transmitters (SCM). The reception terminal station 53-1 comprises an EMS 61-4 and a receiver (SC-Ri) 64-3, and a reception terminal station 53-2 comprises an EMS 61-5 and a receiver (SC-Ri) 64-4.

Also, the HUB node device 52 comprises an EMS 61-3, receivers (SC-Ri) 64-1 and 64-2, receivers (SC-Ro) 63-3 and 63-4, and an optical path switch 65. The SCM is a transmitter for the supervisory control information in accordance with the main signal superposition method, and superposes the supervisory control signal on the optical main signal for each wavelength path. The SC-Ro and the SC-Ri are the receivers in accordance with the main signal superposition method, and extract the supervisory control information superposed on the optical main signal.

Signal light 71 in the wavelength path A sent from the transmission terminal station 51-1 and signal light 72 in the wavelength path B sent from the transmission terminal station 51-2 are transmitted to the reception terminal station 53-2 via the optical path switch 65 of the HUB node device 52.

Upon this, the EMS 61-1 generates supervisory control information 73 for the wavelength path A, and the transmitter 62-1 superposes the supervisory control information 73 on the optical main signal in the wavelength path A. Similarly, the EMS 61-2 generates supervisory control information 74 for the wavelength path B, and the transmitter 62-2 superposes the supervisory control information 74 on the optical main signal in the wavelength path A. As above, in the main signal superposition method, the supervisory control information is superposed on the optical main signal to be transferred.

The above conventional method of transferring supervisory control information has problems as below.

In the HUB node device in the photonic network, the path switch control is conducted in a device by using a MEMS (Micro Electro Mechanical Systems) switch and a wavelength selection switch so that each wavelength path input via an arbitrary route on the input side which is connected to the corresponding device is connected to a desired route on the output side.

In the dedicated wavelength method upon this, in order that each wavelength path and the supervisory control information for the corresponding wavelength path are connected to the same route on the output side, the path switching control has to be conducted both on the optical main signal in the wavelength path and the supervisory control information for the corresponding wavelength path. However, in the dedicated wavelength method, the optical main signal and the supervisory control information for each wavelength path are transmitted respectively having different wavelengths from each other, accordingly, a device for confirming that both of them correspond to each other and are connected to the same route on the output side is required.

To the contrary, in the main signal superposition method, the optical main signal in each wavelength path and the supervisory control information for the corresponding wavelength path are transmitted having the same wavelengths with each other, accordingly, it is not necessary to confirm whether or not both of them correspond to each other as above.

However, in the main signal superposition method, a bit rate of the supervisory control information has to be sufficiently lower than that of the optical main signal, so that the bit rate of the supervisory control information is generally in the range of several hundred bps to several kbps in the order. Accordingly, the transmission rate of the supervisory control information is limited.

Also, in many cases in the main signal superposition method, the supervisory control information can be generated only by the transmission terminal station in each wavelength path and it is difficult to update the supervisory control information in the node devices through which each wavelength path is transmitted as shown in FIG. 1B. Therefore, the main signal superposition method is not suitable for transferring the supervisory control information which has to be updated along the route of the wavelength path.

SUMMARY OF THE INVENTION

A first object of the present invention is to transfer a large amount of supervisory control information while confirming the correspondence between each wave length path and supervisory control information, in a photonic network conducting path switching of the signal light.

A second object of the present invention is to update the supervisory control information while confirming the correspondence between each wavelength path and the supervisory control information, in a node device through which each wave length path is transmitted.

The node device according to the present invention comprises a plurality of input ports and a plurality of output ports in which signal light which is input from one of the above input ports is output from one of the above output ports. This node device comprises a reception device, an extraction device, a control device and a transmission device.

The reception device receives supervisory control information on a dedicated wavelength different from a wavelength of the signal light, which is input from the input port together with the signal light. The extraction device extracts, from the signal light which is to be output from the output port, information superposed on optical main signal of the signal light. The control device confirms whether or not the signal light to be output and the supervisory control information correspond to each other by using the extracted information, and outputs supervisory control information corresponding to the signal light to be output. The transmission device transmits, from the output port, the supervisory control information output from the control device, on the dedicated wavelength.

BRIEF DESCRIPTION OF THE DRAWINGS

FIG. 12 shows a comparison between conventional methods with the method according to the present invention.

DESCRIPTION OF THE PREFERRED EMBODIMENTS

Figure 1A:
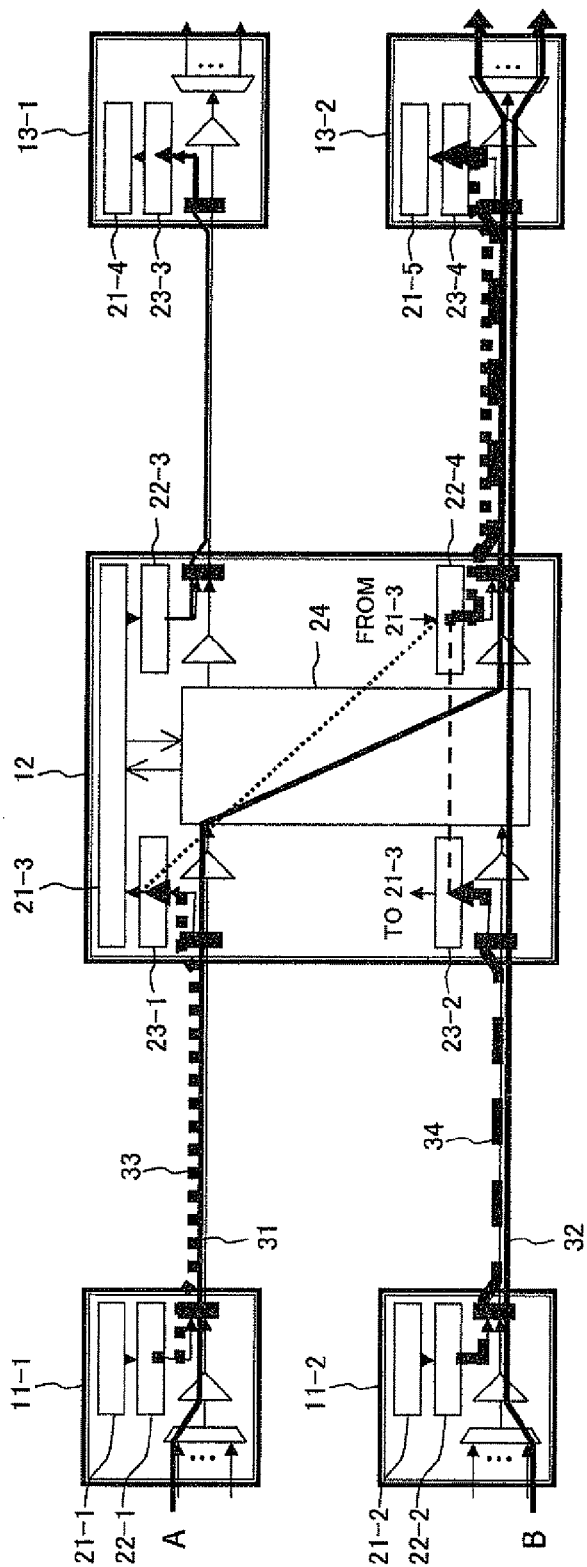
FIG. 1A shows a conventional dedicated wavelength method.
Figure 1B:
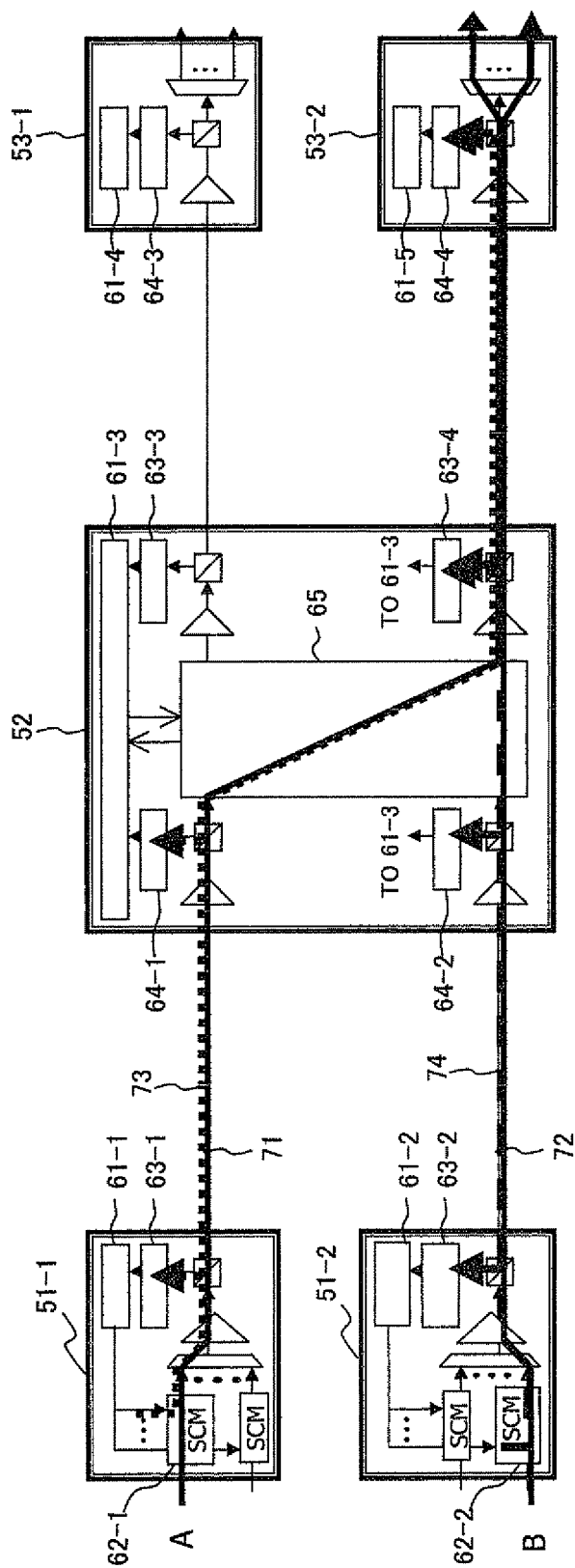
FIG. 1B shows a conventional main signal superposition method.

Hereinafter, the most preferred embodiments of the present invention will be explained in detail, by referring to the drawings.

Figure 2:
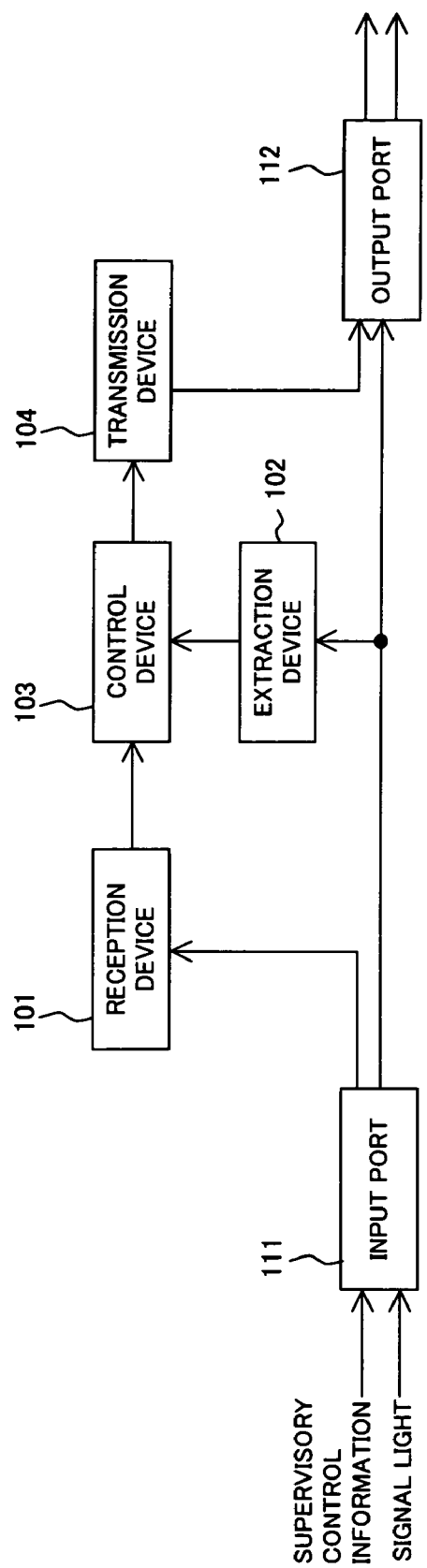
FIG. 2 shows a principle of a node device of the present invention.

FIG. 2 shows a principle of a node device of the present invention. The node device in FIG. 2 comprises a plurality of input ports and a plurality of output ports, and signal light which has been input from one of the above input ports is output from one of the above output ports. The node device comprises a reception device 101, an extraction device 102, a control device 103 and a transmission device 104.

The reception device 101 receives supervisory control information on a dedicated wavelength being different from the wavelength of the signal light, which is input together with the signal light from an input port 111. The extraction device 102 extracts information superposed on the optical main signal of the signal light which is to be output from an output port 112. A control device 103 confirms whether or not the signal light to be output and the supervisory control information correspond to each other by using the extracted information, and outputs the supervisory control information which corresponds to the signal light to be output. The transmission device 104 transmits the supervisory control information output from the control device 103 on a dedicated wavelength from the output port 112.

When the signal light and the supervisory control information are input from the input port 111, the supervisory control information is received by the reception device 101, and is transferred to the control device 103. Also, the information which has been superposed on the optical main signal of the signal light to be output is extracted by the extraction device 102, and the extracted information is transferred to the control device 103. The control device 103 confirms whether or not the signal light to be output and the supervisory control information received from the reception device 101 correspond to each other by using the information received from the extraction device 102. Then, the supervisory control information which has been confirmed to correspond to the signal light is transmitted on the dedicated wavelength by the transmission device 104.

The reception device 101 corresponds, for example, to receivers 218-1 and 218-2 in FIG. 3A or receivers 318-1 in FIG. 3B which will be described later, and the extraction device 102 corresponds, for example, to receivers 213-3, 213-4, 219-1 and 219-2 in FIG. 3A or a receiver 313-2 and 319-1 in FIG. 3B. The control device 103 corresponds, for example, to an EMS 211-3 in FIG. 3A or an EMS 311-2 in FIG. 3B, and the transmission device 104 corresponds, for example, to receivers 212-3 and 212-4 in FIG. 3A or a receiver 312-2 in FIG. 3B.

According to the present invention, in node devices such as a HUB node device, an OADM node device, and the like comprising a plurality of input ports and a plurality of output ports, a large amount of supervisory information in accordance with the dedicated wavelength method can be transferred, and also, the correspondence between the signal light and the supervisory control information in each wavelength path can be confirmed.

Further, by transferring the supervisory control information in accordance with the dedicated wavelength method, the supervisory control information can be easily updated in the node devices through which each wavelength path is transmitted.

In a photonic network in a present embodiment, a communication path is provided for transferring a large amount of the supervisory control information on a wavelength dedicated for the supervisory control information which is set to be out of the signal wavelength band of the WDM signal, and also, the normality of the above supervisory control information transferred on the dedicated wavelength is confirmed by the supervisory control information which is transferred being superposed on the optical main signal in each wavelength path.

Figure 3A:
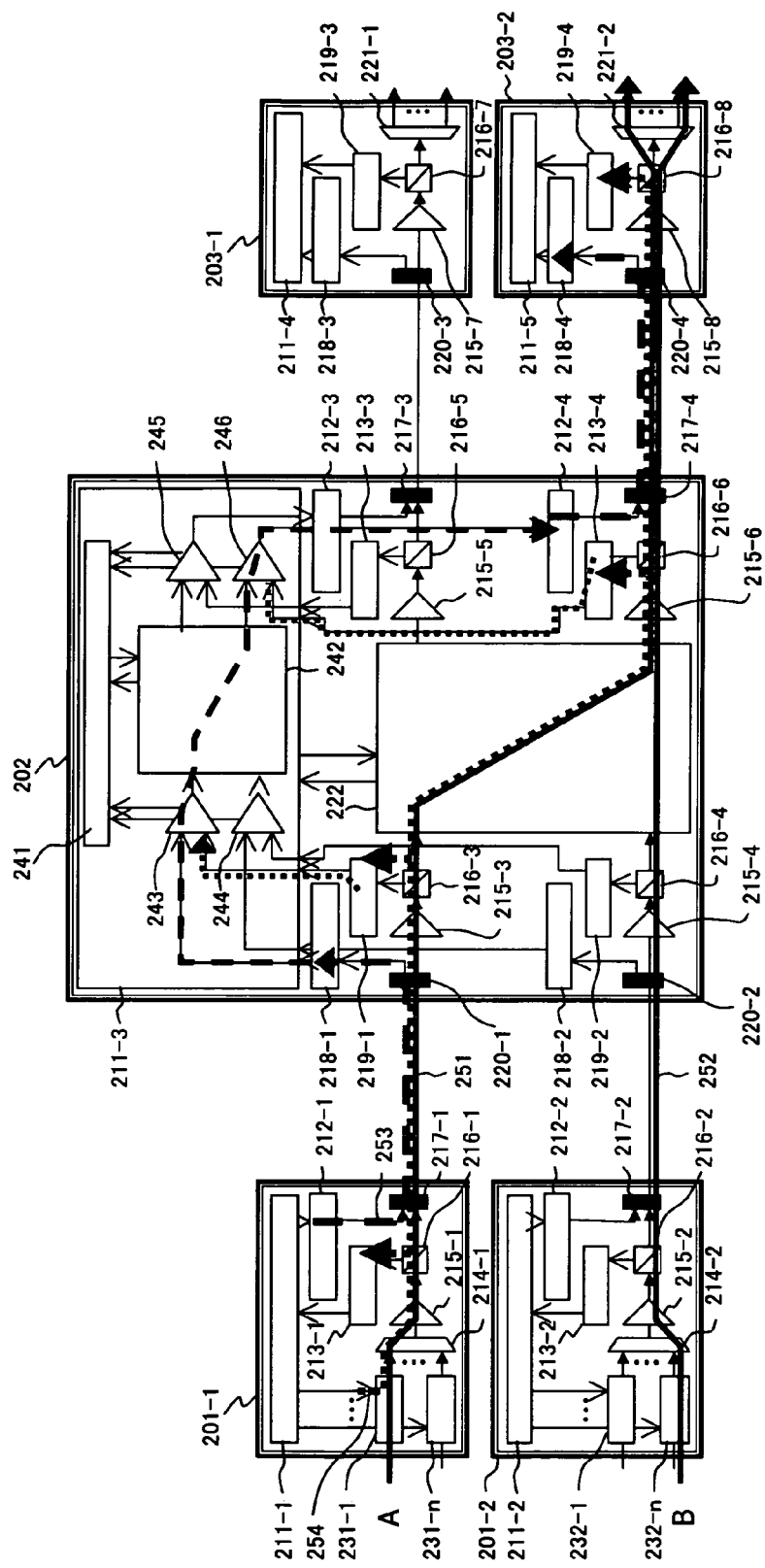
FIG. 3A shows a first photonic network system.

FIG. 3A shows an example of a photonic network in an embodiment. This network comprises transmission terminal stations 201-1 and 201-2, a HUB node device 202 and reception terminal stations 203-1 and 203-2. Each transmission terminal station is connected to the HUB node device 202 via an optical fiber, and each reception terminal station is connected to the HUB node device 202 via the optical fiber as well.

The transmission terminal station 201-1 comprises the EMS 211-1, the transmitter (OSC-S) 212-1, the receiver (SC-Ro) 213-1, the transmitters (SCM) 231-1 to 231-n, multiplexers 214-1 and 217-1, an optical amplifier 215-1, and an optical coupler 216-1.

The transmission terminal station 201-2 comprises the EMS 211-2, the transmitter (OSC-S) 212-2, the receiver (SC-Ro) 213-2, the transmitters (SCM) 232-1 to 232-n, multiplexers 214-2 and 217-2, an optical amplifier 215-2, and an optical coupler 216-2.

The reception terminal station 203-1 comprises an EMS 211-4, a receiver (OSC-R) 218-3, a receiver (SC-Ri) 219-3, demultiplexers 220-3 and 221-1, an optical amplifier 215-7, and an optical coupler 216-7.

The reception terminal station 203-2 comprises an EMS 211-5, a receiver (OSC-R) 218-4, a receiver (SC-Ri) 219-4, demultiplexers 220-4 and 221-2, an optical amplifier 215-8, and an optical coupler 216-8.

Also, the HUB node device 202 comprises two input ports via which the WDM signal is input, two output ports via which the WDM signal is output, the EMS 211-3, the receivers (OSC-R) 218-1 and 218-2, the transmitters (OSC-S) 212-3 and 212-4, the receivers (SC-Ro) 213-3 and 213-4, the receivers (SC-Ri) 219-1 and 219-2, the demultiplexers 220-1 and 220-2, the multiplexers 217-3 and 217-4, the optical amplifiers 215-3, 215-4, 215-5, 215-6, optical couplers 216-3, 216-4, 216-5, 216-6, and an optical path switch 222.

The EMS 211-3 comprises a controller 241, a supervisory control information switch unit 242 and comparators 243 to 246.

Signal light 251 in the wavelength path A sent from the transmission terminal station 201-1 and signal light 252 in the wavelength path B sent from the transmission terminal station 201-2 are transmitted to the reception terminal station 203-2 via the optical path switch 222 of the HUB node device 202. The optical path switch 222 is a switch with two inputs and two outputs, and conducts a path switching of the signal light as the light without the photoelectric conversion for each wavelength.

Upon this, in the transmission terminal station 201-1, the EMS 211-1 generates supervisory control information 253 for the wavelength path A in accordance with the dedicated wavelength method and supervisory control information 254 for the wavelength path A in accordance with the main signal superposition method, and transfers the information 253 and the information 254 respectively to the transmitter 212-1 and the transmitter 231-1. The transmitter 212-1 converts the supervisory control information 253 received as the electrical signal into the optical signal on a dedicated wavelength, and outputs the optical signal to the multiplexer 217-1. The transmitter 231-1 superposes the received supervisory control information 254 on the optical main signal in the wavelength path A, and outputs the information 254 superposed on the main signal to the multiplexer 214-1.

The multiplexer 214-1 multiplexes the signal light in n wavelength paths from the transmitters 231-1 to 231-n. The output from the multiplexer 214-1 is input to the optical coupler 216-1 via the optical amplifier 215-1, and branches in to two. One output from the optical coupler 216-1 is input to the receiver 213-1, and the other output is input to the multiplexer 217-1. The multiplexer 217-1 multiplexes the outputs respectively from the transmitter 212-1 and the optical coupler 216-1, and outputs the multiplexed light to the optical fiber connected to the HUB node device 202.

Similarly in the transmission terminal station 201-2, the supervisory control information for the wavelength path B in accordance with the dedicated wavelength method and the supervisory control information for the wavelength path B in accordance with the main signal superposition method are generated. The latter is superposed on the optical main signal, the former is multiplexed with the signal light, thereafter, they are transferred to the HUB node device 202.

In the HUB node device 202, the demultiplexer 220-1 is connected to an input port via which the signal light in the wavelength path A from the transmission terminal station 201-1 is input, and demultiplexes the signal light 251 and the supervisory control information 253 in accordance with the dedicated wavelength method. The signal light 251 is input to the optical coupler. 216-3 via the optical amplifier 215-3, and branches into two. The supervisory control information 253 is input to the receiver 218-1. One output from the optical coupler 216-3 is input to the optical path switch 222, and the other output is input to the receiver 219-1.

The receiver 218-1 converts the supervisory control signal 253 received as the optical signal into the electrical signal, and transfers the electrical signal to the EMS 211-3. The receiver 219-1 extracts the supervisory control information 254 superposed on the optical main signal, and transfers the extracted information 254 to the EMS 211-3.

Similarly for the wavelength path B, the signal light 252 and the supervisory control information in accordance with the dedicated wavelength method are demultiplexed. The supervisory control information is input to the receiver 218-2, the signal light is input to the optical path switch 222 and the receiver 219-2. Then, the supervisory control information in accordance with the dedicated wavelength method and the supervisory control information in accordance with the main signal superposition method are transferred to the EMS 211-3.

One output from the optical path switch 222 is input to the optical coupler 216-6 via the optical amplifier 215-6, and branches into two. One output from the optical coupler 216-6 is input to the multiplexer 217-4, and the other output is input to the receiver 213-4.

The receiver 213-4 extracts the supervisory control information 254 superposed on the optical main signal in the wavelength path A, and transfers the extracted information 254 to the EMS 211-3. The transmitter 212-4 converts the supervisory control information 253 received from the EMS 211-3 as the electrical signal into the optical signal on a dedicated wavelength, and outputs the optical signal to the multiplexer 217-4. The multiplexer 217-4 multiplexes the output from the transmitter 212-4 and the output from the optical coupler 216-6, and outputs the multiplexed light to the optical fiber connected to the reception terminal station 203-2.

Similarly for the wavelength path B, the supervisory control information in accordance with the main signal superposition method is transferred to the EMS 211-3 by the receiver 213-4, and the supervisory control information in accordance with the dedicated wavelength method is multiplexed with the signal light 252 by the transmitter 212-4 and the multiplexer 217-4.

Also similarly for the other output from the optical path switch 222, the supervisory control information in accordance with the main signal superposition method is transferred to the EMS 211-3 by the receiver 213-3. Then, the supervisory control information in accordance with the dedicated wavelength method is multiplexed with the signal light by the transmitter 212-3 and the multiplexer 217-3, and is output to the optical fiber connected to the reception terminal station 203-1.

The supervisory control information switch unit 242 of the EMS 211-3 functions as a switch with two inputs and two outputs similarly to the optical path switch 222, and outputs the supervisory control information in accordance with the dedicated wavelength method input to the EMS 211-3 to the path corresponding to the output port to which the signal light is output as well.

The comparator 243 compares the supervisory control information 253 in accordance with the dedicated wavelength method received from the receiver 218-1 with the supervisory control information 254 in accordance with the main signal superposition method received from the receiver 219-1. Thereby, it can be confirmed whether or not the supervisory control information 253 in accordance with the dedicated wavelength method input to the input port for the wavelength path A and the signal light in the wavelength path A corresponds to each other. The comparator 243 outputs the comparison result of the supervisory control information and the supervisory control information 253 in accordance with the dedicated wavelength method to the controller 241. Also, the comparator 243 outputs the supervisory control information 253 in accordance with the dedicated wavelength method to the supervisory control information switch unit 242.

Similarly, the comparator 244 compares the supervisory control information in accordance with the dedicated wavelength method input to the other input port with the supervisory control information in accordance with the main signal superposition method, and outputs the comparison result and the supervisory control information in accordance with the dedicated wavelength method to the controller 241. Also, the comparator 244 outputs the supervisory control information in accordance with the dedicated wavelength method to the supervisory control information switch unit 242.

The controller 241 controls the supervisory control information switch unit 242 based on the received comparison result and the supervisory control information, and outputs the supervisory control information in accordance with the dedicated wavelength method on the path corresponding to the output port to which the signal light is output as well.

The comparator 246 compares the supervisory control information 253 in accordance with the dedicated wavelength method output from the supervisory control information switch unit 242 with the supervisory control information 254 in accordance with the main signal superposition method received from the receiver 213-4. Thereby, it can be confirmed whether or not the signal light in the wavelength path A and the supervisory control information 253 in accordance with the dedicated wavelength method which is to be output from the output port from which the signal light is output as well correspond to each other. The comparator 246 outputs the comparison result of the supervisory control information to the controller 241. Also, the comparator 246 outputs the supervisory control information 253 in accordance with the dedicated wavelength method to the transmitter 212-4.

Similarly, the comparator 246 compares the supervisory control information in accordance with the dedicated wavelength method for the wavelength path B with the supervisory control information in accordance with the main signal superposition method, and outputs the comparison result to the controller 241. Also, the comparator 246 outputs the supervisory control information in accordance with the dedicated wavelength method to the transmitter 212-4.

Also, the comparator 245 compares the supervisory control information in accordance with the dedicated wavelength method output from the supervisory control information switch unit 242 with the supervisory control information 254 in accordance with the main signal superposition method received from the receiver 213-3. Then, the comparator 245 outputs the comparison result to the controller 241, and outputs the supervisory control information in accordance with the dedicated wavelength method to the transmitter 212-3.

As above, by comparing the supervisory control information in accordance with the dedicated wavelength method with the supervisory control information in accordance with the main signal superposition method, it can be confirmed whether or not the signal light in each wavelength path being transmitted via the input port/output port and the supervisory control information in accordance with the dedicated wavelength method correspond to each other. When they correspond to each other, it is determined that the corresponding supervisory control information is normal.

When the signal light and the supervisory control information in accordance with the dedicated wavelength method do not correspond to each other, the controller 241 corrects the supervisory control information, and thereafter, transfers the corrected supervisory control information to the transmitter 212 via the supervisory control information switch unit 242. Thereby, the normality of the supervisory control information is secured, so that the reliability in operating and managing the photonic network is improved.

The EMSs 211-1, 211-2, 211-4, and 211-5 each comprise a controller and one comparator, and have the function for confirming the normality of the supervisory control information being transmitted via the input port/output port, similarly to the EMS 211-3.

Figure 3B:
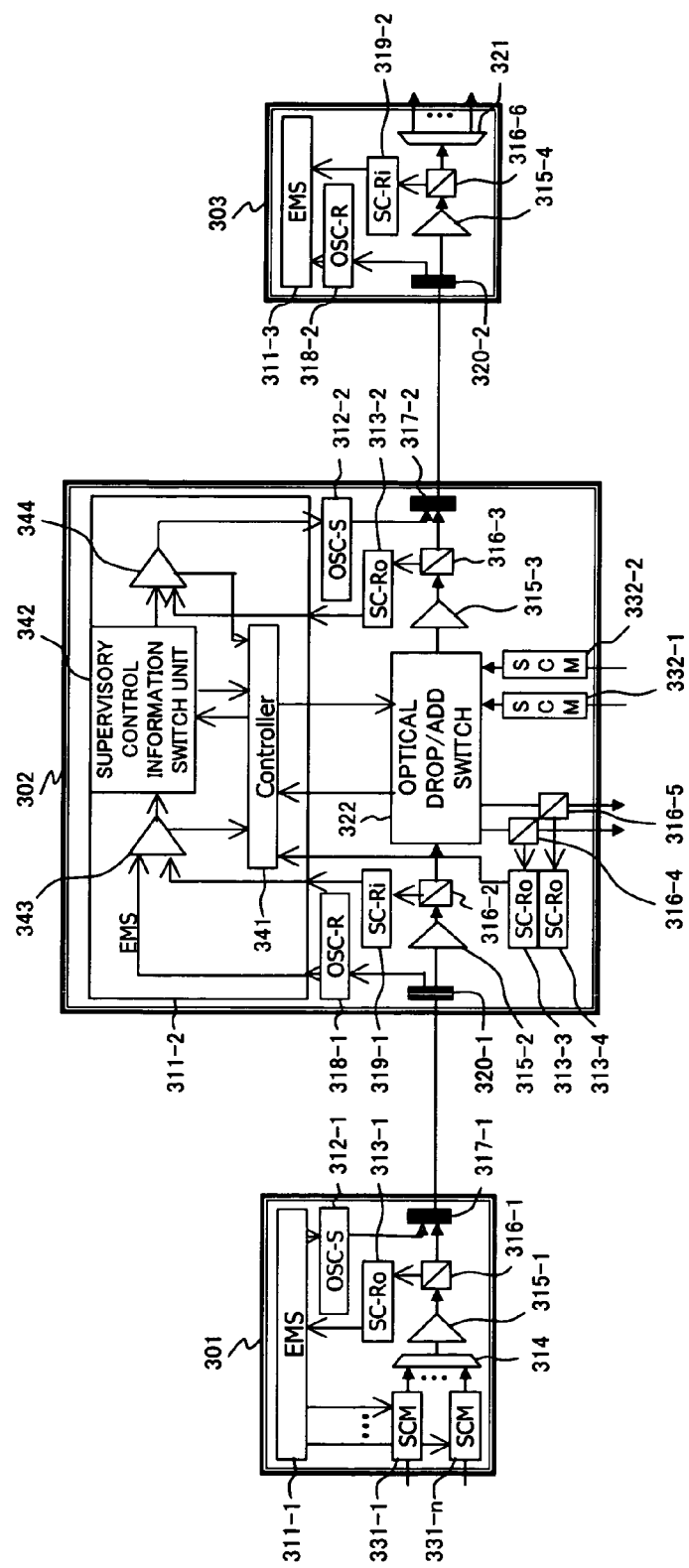
FIG. 3B shows a second photonic network system.

FIG. 3B shows an example of a photonic network in another embodiment. This network comprises a transmission terminal station 301, an OADM node device 302 and a reception terminal station 303. The transmission terminal station 301 and the OADM node device 302 are connected to each other via the optical fiber. Similarly, the OADM node device 302 and the reception terminal station 303 are connected to each other via the optical fiber.

The transmission terminal station 301 comprises an EMS 311-1, a transmitter (OSC-S) 312-1, a receiver (SC-Ro) 313-1, a transmitters (SCM) 331-1 to 331-n, multiplexers 314 and 317-1, an optical amplifier 315-1 and an optical coupler 316-1.

The reception terminal station 303 comprises an EMS 311-3, a receiver (OSC-R) 318-2, a receiver (SC-Ri) 319-2, demultiplexers 320-2 and 321, an optical amplifier 315-4 and an optical coupler 316-6.

The OADM node device 302 comprises an input port to which a WDM signal is input from the transmission terminal station 301, an output port for outputting the WDM signal to the reception terminal station 303, two dropping output ports, and two adding input ports. The OADM node device 302 comprises the EMS 311-2, the receiver (OSC-R) 318-1, the transmitter (OSC-S) 312-2, the receivers (SC-Ro) 313-2, 313-3 and 313-4, transmitters (SCM) 332-1 and 332-2, a receiver (SC-Ri) 319-1, a demultiplexer 320-1, a multiplexer 317-2, optical amplifiers 315-2 and 315-3, optical couplers 316-2, 316-3, 316-4, 316-5 and an optical drop/add switch 322.

The EMS 311-2 comprises a controller 341, a supervisory control information switch unit 342 and comparators 343 and 344.

The WDM signal output from the transmission terminal station 301 is transferred to the reception terminal station 303 via the OADM node device 302. Upon this, the optical drop/add switch 322 can drop the signal light in some wavelength paths and add the signal light in a new wavelength path.

The EMS 311-2 confirms the normality of the supervisory control information in accordance with the dedicated wavelength method by comparing the supervisory control information in accordance with the dedicated wavelength method with the supervisory control information in accordance with the main signal superposition method similarly to the EMS 211-3 in FIG. 3A. The EMSs 311-1 and 311-3 each comprise a controller and one comparator, and confirm the normality of the supervisory control information in accordance with the dedicated wavelength method similarly to the EMS 311-2.

In the above FIG. 3B, the case where two dropping output ports and two adding input ports are provided in the OADM node device, however, it is more common that n dropping output ports and n adding output ports are provided.

Next, a method of confirming the normality of the supervisory control information by the EMS will be explained more specifically by referring to FIG. 4 to FIG. 11.

Below, a configuration and operations of the EMS 211-3 of the HUB node device 202 shown in FIG. 3A will be explained, however, the above configuration and operations can be realized in other EMSs similarly to the EMS 211-3. Also, the HUB node device 202 has two inputs and two outputs, however, explanations will be given regarding a HUB node device with N inputs and N outputs which configuration is more common. As methods of confirming the normality of the supervisory control information, three methods as below are possible, for example.

(1) Confirmation Method 1

Information which specifies the conformance/non-conformance between the supervisory control information in accordance with the main signal superposition method and the supervisory control information in accordance with the dedicated wavelength method is prepared in the frame format of the supervisory control information in accordance with the dedicated wavelength method, and the validity/invalidity of the supervisory control information in accordance with the dedicated wavelength method is discriminated based on the above prepared information.

(2) Confirmation Method 2

The supervisory control information which is to be output from the node device in accordance with the dedicated wavelength method is compared with the supervisory control information in accordance with the main signal superposition method detected on the output side of the node device, thereby, the validity/invalidity of the supervisory control information in accordance with the dedicated wavelength method is discriminated.

(3) Confirmation Method 3

Output port for outputting the supervisory control information in accordance with the dedicated wavelength method is determined based on the supervisory control information in accordance with the main signal superposition method detected on the output side of the node device, and the supervisory control information in accordance with the dedicated wavelength method is output from the above determined output port.

Figure 4:
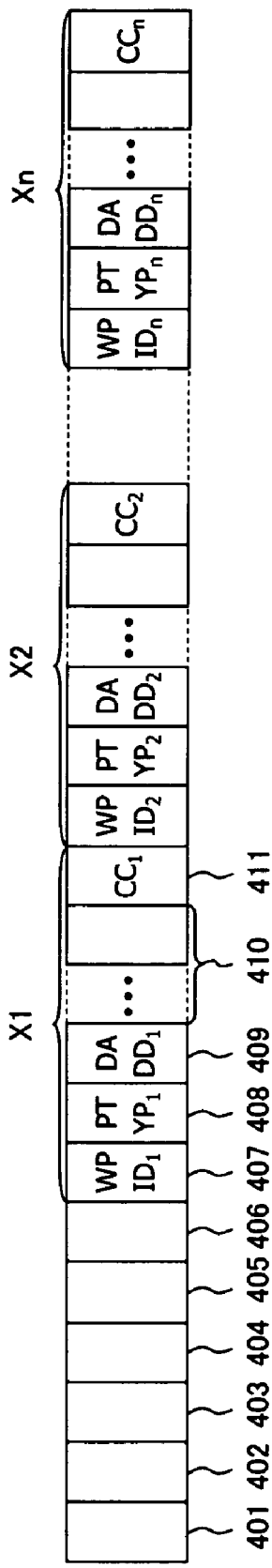
FIG. 4 shows first supervisory control information in accordance with the dedicated wavelength method.
Figure 5:
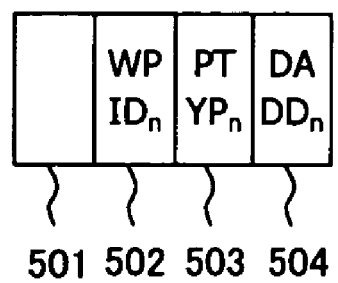
FIG. 5 shows supervisory control information in accordance with the main signal superposition method.

FIG. 4 shows an example of frame format of the supervisory control information in accordance with the dedicated wavelength method which is used in the confirmation method 1. FIG. 5 shows an example of the frame format of the supervisory control information in accordance with the main signal superposition method which is used in the confirmation method 1.

In the frame of the supervisory control information in accordance with the dedicated wavelength method, bytes for serially recording supervisory control information X1 to Xn in respective wavelength paths included in WDM signal in the order from the short wavelength side to the long wavelength side of the signal light are included, subsequently to a frame synchronization byte 401 for the supervisory control information frame itself, a path trace byte 402, a byte for recording order wire 403, a byte for recording user channel 404, a byte for recording data channel 405, a byte for recording an alarm transference 406.

Supervisory control information Xk in a wavelength path having a wavelength with a wavelength number k (k =1, 2, ..., n) consists of following bytes.

407: Wavelength path ID which is uniquely set in the network (WPIDk)
408: Type of the client format (SONET, SDH, OTN, Ethernet (registered trademark) and the like) (PTYPk)
409: Address of destination node for wavelength path (DAADk)
410: Information which has to be updated as time elapses during use of wavelength path such as signal quality information such as OSNR (Optical Signal to Noise Ratio) or the like, history information of the transmitting node, and failure alarm information
411: Information specifying conformance/non-conformance between the supervisory control information in accordance with main signal superposition method and the supervisory control information in accordance with the dedicated wavelength method (CCk)

When CCk=0, it means that there is a non-conformance between the two supervisory control information with the wavelength number k. When CCk=1, it means that there is a conformance between the above two information.

In the frame of the supervisory control information in accordance with the main signal superposition method, bytes as below are included in addition to a frame synchronization byte 501 for the supervisory control information frame itself.
502: Wavelength path ID with the wavelength number k (WPIDk)
503: Type of client format (PTYPk)
504: Address of destination node for wavelength path (DAADk)

These bytes do not have to be updated after the recording of the corresponding information upon the start of the use of the wavelength path, and are bytes which record only the minimum information.

Figure 6:
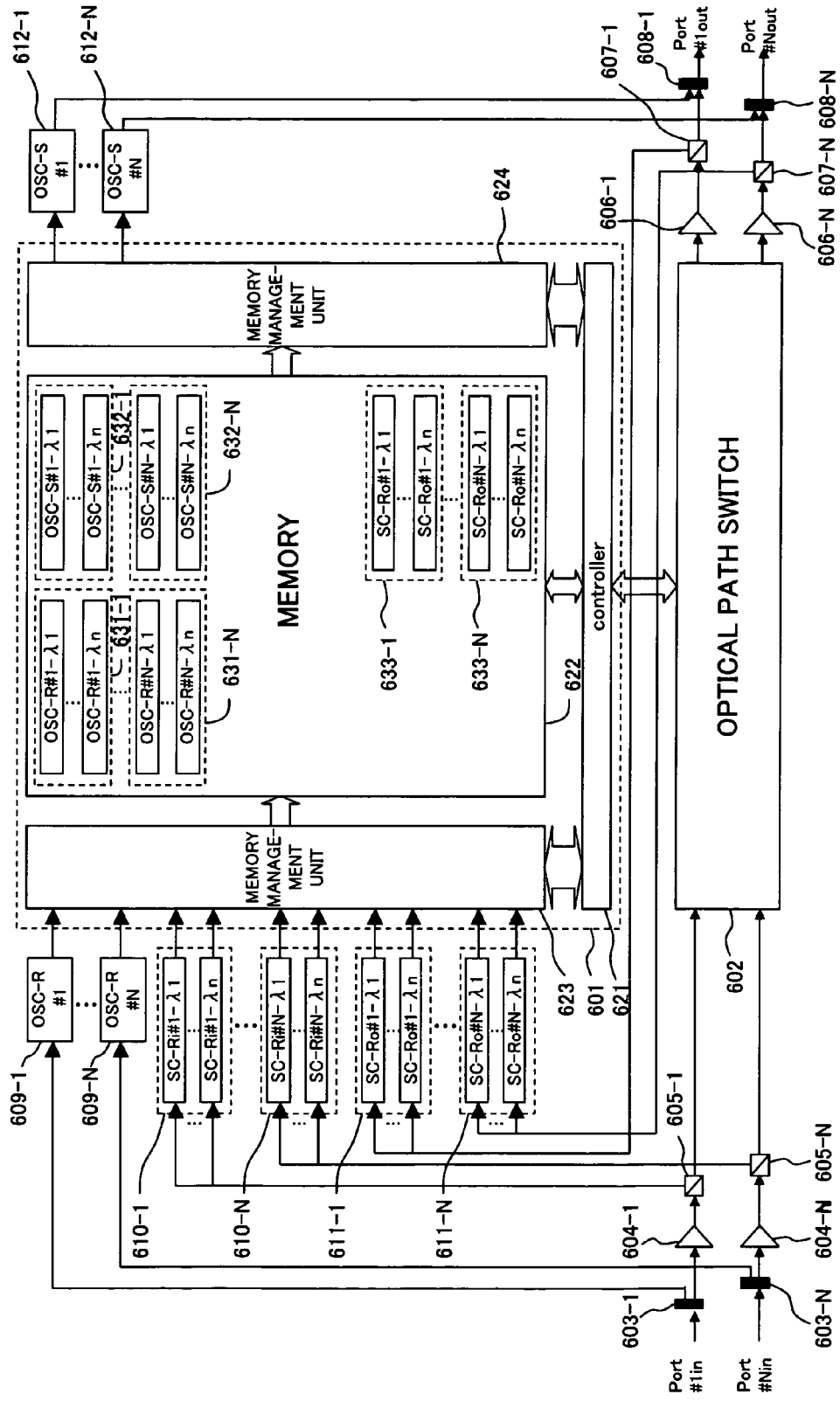
FIG. 6 shows a configuration of a first HUB node device.

FIG. 6 shows an example of a configuration of a HUB node device in the case where the confirmation method 1 is employed. The HUB node device in FIG. 6 comprises input ports #1 to #N, output ports #1 to #N, the EMS 601, an optical path switch 602, demultiplexers 603-1 to 603-N, optical amplifiers 604-1 to 604-N and 606-1 to 606-N, optical couplers 605-1 to 605-N and 607-1 to 607-N, multiplexers 608-1 to 608-N, receivers (OSC-R) 609-1 to 609-N, receivers (SC-Ri) 610-1 to 610-N, receivers (SC-Ro) 611-1 to 611-N, and transmitters (OSC-S) 612-1 to 612-N.

The EMS 601 comprises a controller 621, memory 622 and memory management units 623 and 624. The memory 622 and the memory management units 623 and 624 correspond to the supervisory control information switch unit 242 in FIG. 3A. The controller 621 corresponds to a processor for example, and realizes functions of the controller 241 and the comparators 243 to 246 in FIG. 3A by executing a program prepared beforehand.

In regions 631-1 to 631-N in the memory 622, the supervisory control information in accordance with the dedicated wavelength method received by the receivers 609-1 to 609-N is stored, and in regions 632-1 to 632-N, the supervisory control information in accordance with the dedicated wavelength method transmitted from the transmitters 612-1 to 612-N is stored. Also, in regions 633-1 to 633-N, the supervisory control information in accordance with the main signal superposition method received by the receivers 611-1 to 611-N is stored.

Figure 7:
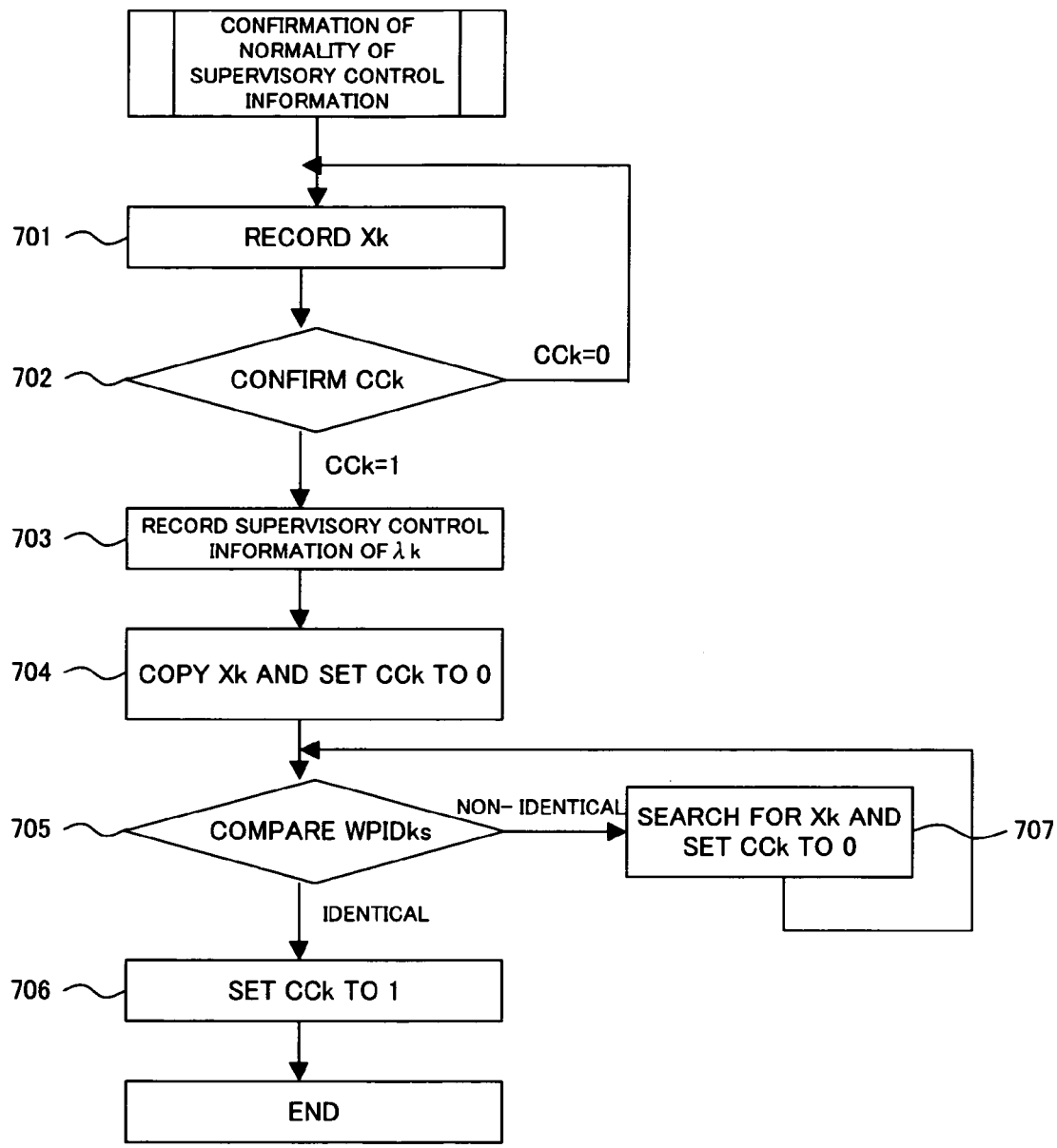
FIG. 7 is a flowchart for a first normality confirmation process.

FIG. 7 is a flow chart for the normality confirmation process (confirmation method 1) for the supervisory control information in the EMS 601 in FIG. 6. This flowchart is explained on an assumption that signal light with the wavelength number k (wavelength λk) input via the input port #m is output via the output port #p.

The controller 621 first stores, in a queue with the wavelength number k in the region 631-m (OSC-R#m-λk), the supervisory control information Xk in accordance with the dedicated wavelength method in the wavelength path having the wavelength λk input to the memory management unit 623 from the receiver 609-m (step 701).

Next, a value of CCk byte of the supervisory control information Xk in the OSC-R#m-λk is checked (step 702). When CCk=0, the input supervisory control information Xk does not conform with the supervisory control information in accordance with the main signal superposition method, accordingly, the processes in the step 701 and subsequent steps are repeated.

When CCk=1, the supervisory control information Xk conforms with the supervisory control information in accordance with the main signal superposition method, accordingly then, the supervisory control information in accordance with the main signal superposition method in the wavelength path having the wavelength λk input to the memory management unit 623 from the receiver 611-p is stored in the queue with the wavelength number k in the region 633-p (SC-Ro#p-λk) (step 703).

Next, the supervisory control information Xk in the OSC-R#m-λk is copied onto the queue with the wavelength number k in the region 632-p (OSC-S#p-λk) corresponding to the output port #p from which the signal light is to be output, by referring to path switch information of the signal light held by the controller 621 (step 704). Then, the CCk byte of the supervisory control information Xk in the OSC-S#p-λk is set to 0.

Next, the WPIDk of supervisory control information in the SC-Ro#p-λk is compared with the WPIDk of the supervisory control information Xk in the OSC-S#p-λk (step 705). When they are identical to each other, the CCk byte for the supervisory control information Xk in the OSC-S#p-λk is set to 1 in order to specify the conformance between the supervisory control information Xk in accordance with the dedicated wavelength method which is to be output from the output port #p and the supervisory control information in accordance with the main signal superposition method (step 706).

When the above two IDs are not identical to each other, all the queues in the regions 631-1 to 631-N are searched for the supervisory control information with the wavelength path ID which is identical to the WPIDk in the SC-Ro#p-λk (step 707). Then, the supervisory control information is copied onto the OSC-S#p-λk as Xk, the CCk byte of the supervisory control information Xk is set to 0, thereafter, the processes in the step 705 and subsequent steps are repeated.

According to the above normality confirmation process, when the supervisory control information in accordance with the dedicated wavelength method and the supervisory control information in accordance with the main signal superposition method do not conform with each other, the supervisory control information with CCk=0 is output from the OSC-S#p-λk to the transmitter 612-p via the memory management unit

624. And when the above two supervisory control information conform with each other, the supervisory control information with the CCk =1 is output to the transmitter 612-p from the OSC-S#p-λk. Accordingly, the information specifying the validity/invalidity of the supervisory control information in accordance with the dedicated wavelength method can be updated while confirming the normality of the above supervisory control information in accordance with the dedicated wavelength method.

Figure 8:
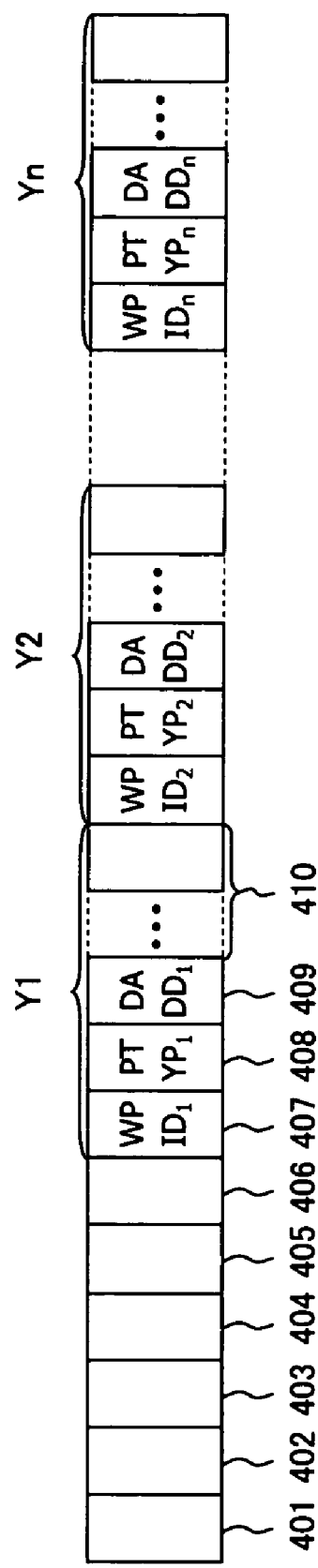
FIG. 8 shows second supervisory control information in accordance with the dedicated wavelength method.

FIG. 8 shows an example of a frame format of a supervisory control information in accordance with the dedicated wavelength method used in the above described confirmation method 2. This frame has a configuration in which the supervisory control information Xk in the frame in FIG. 4 is replaced by supervisory control information Yk. The supervisory control information Yk has a configuration in which the CCk byte is removed from the supervisory control information Xk.

In the confirmation method 2, the frame format of the supervisory control information in accordance with the main signal superposition method is the same as that shown in FIG. 5, and the configuration in the HUB node device is the same as that shown in FIG. 6.

Figure 9:
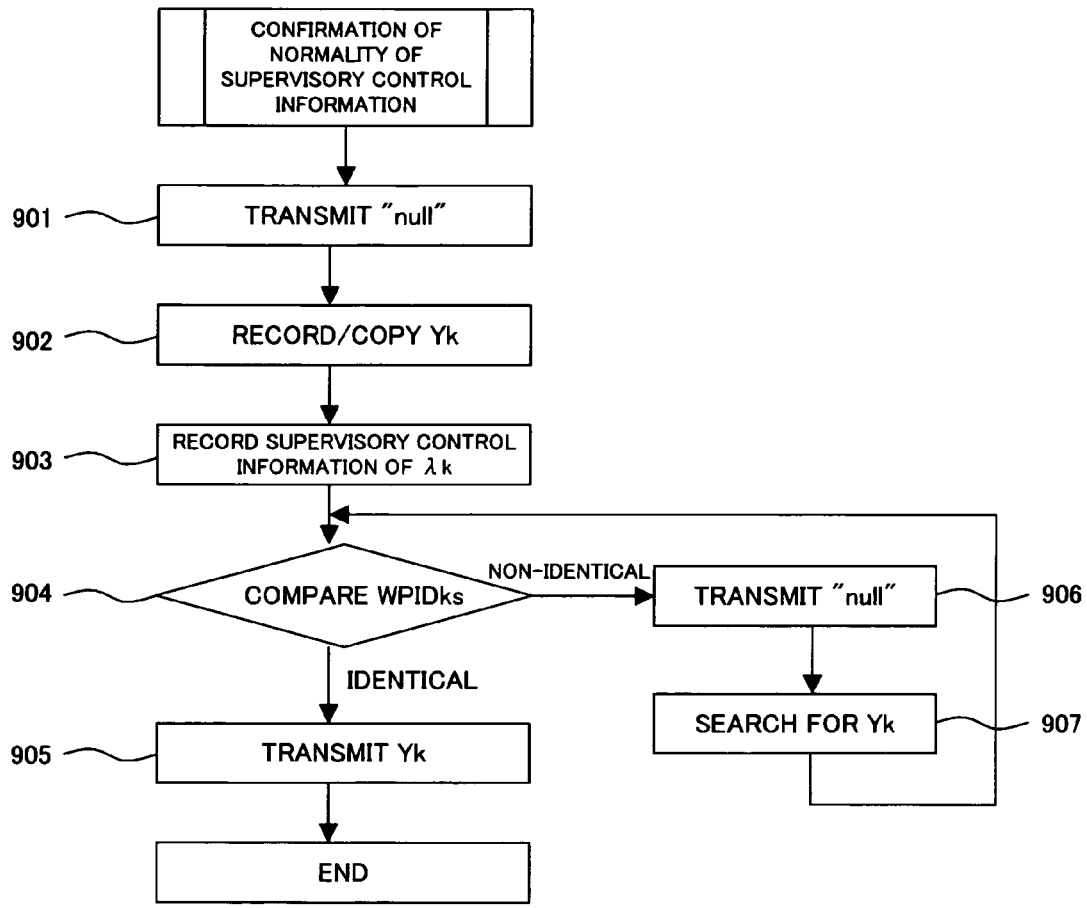
FIG. 9 is a flowchart for a second normality confirmation process.

FIG. 9 is a flowchart for the normality confirmation process of the supervisory control information in the EMS 601 in FIG. 6 (confirmation method 2). The controller 621 first sets "null" for specifying invalidity in the queue with the wavelength number k in the region 632-p (OSC-S#p-λk) corresponding to the output port #p, and outputs the "null" in the queue as the supervisory control information to the transmitter 612-p (step 901). Thereby, the supervisory control information "null" is transmitted from the output port #p in accordance with the dedicated wavelength method.

Next, the supervisory control information Yk in accordance with the dedicated wavelength method in the wavelength path having the wavelength λk input to the memory management unit 623 from the receiver 609-m is stored in the queue with the wavelength number k in the region 631-m (OSC-R#m-λk) (step 902). Then, the supervisory control information Yk in the OSC-R#m-λk is copied onto the OSC-S#p-λk, by referring to the path switch information.

Next, the supervisory control information in accordance with the main signal superposition method in the wavelength path having the wavelength λk input to the memory management unit 623 from the receiver 611-p is stored in the queue with the wavelength number k in the region 633-p (SC-Ro#p-λk) (step 903).

Next, the WPIDk of the supervisory control information in the SC-Ro#p-λk is compared with the WPIDk of the supervisory control information Yk in the OSC-S#p-λk (step 904). When the above two WPIDks are identical to each other, the supervisory control information Yk in the OSC-S#p-λk is output to the transmitter 612-p (step 905). Thereby, the supervisory control information Yk conforming with the supervisory control information in accordance with the main signal superposition method is transmitted from the output port #p in accordance with the dedicated wavelength method.

When they are not identical to each other, "null" is set in OSC-S#p-λk and output as the supervisory control information to the transmitter 612-p (step 906). Thereby, the supervisory control information "null" is transmitted from the output port #p in accordance with the dedicated wavelength method. Additionally, when the supervisory control information in the OSC-S#p-λk is "null" in step 904, it is determined that the two WPIDks are not identical to each other.

Next, all the queues in the regions 631-1 to 631-N are searched for the supervisory control information with the wavelength path ID which is identical to the WPIDk in the SC-Ro#p-λk (step 907). Then, the supervisory control information is copied onto the OSC-S#p-λk as Yk, and the processes in the step 904 and subsequent steps are repeated.

According to the above normality confirmation process, when the supervisory control information in accordance with the dedicated wavelength method and the supervisory control information in accordance with the main signal superposition method do not conform with each other, "null" is output to the transmitter 612-p. And when the above two supervisory control information conform with each other, the supervisory control information Yk is output to the transmitter 612-p. Accordingly, the valid supervisory control information Yk can be transmitted to next node device while confirming the normality of the supervisory control information in accordance with the dedicated wavelength method.

Next, the previously described confirmation method 3 will be explained. In the confirmation method 3, the frame format of the supervisory control information in accordance with the dedicated wavelength method is the same with that shown in FIG. 8, and the frame format of the supervisory control information in accordance with the main signal superposition method is the same with that shown in FIG. 5.

Figure 10:
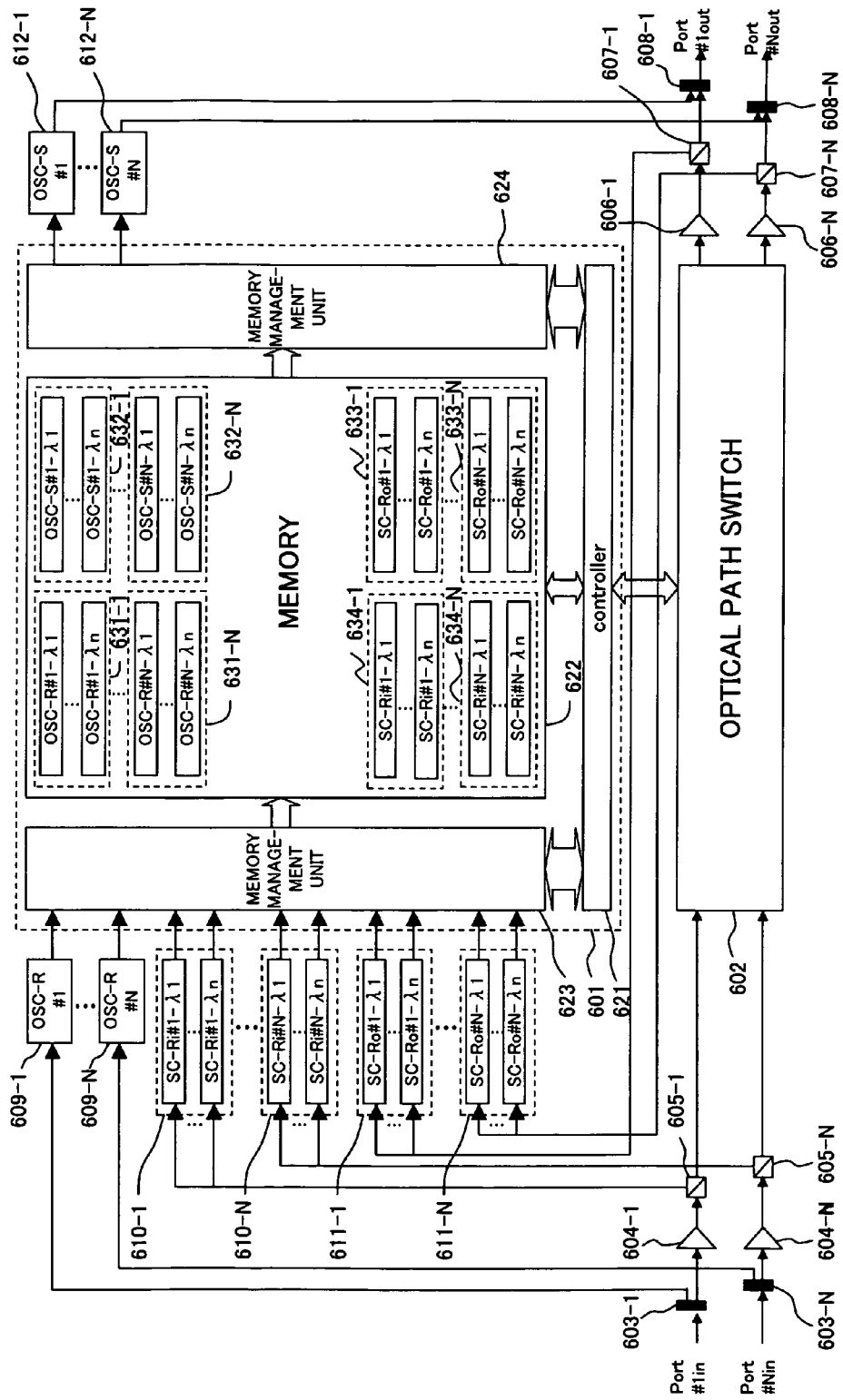
FIG. 10 shows a configuration of a second HUB node device.

FIG. 10 shows an example of a configuration of a HUB node device in the case where the confirmation method 3 is employed. The HUB node device in FIG. 10 has the same configuration with that in the HUB node device shown in FIG. 6, however, regions 634-1 to 634-N are added in the memory 622. In the regions 634-1 to 634-N, the supervisory control information in accordance with the main signal superposition method received by the receiver 610-1 to 610-N is stored.

Figure 11:
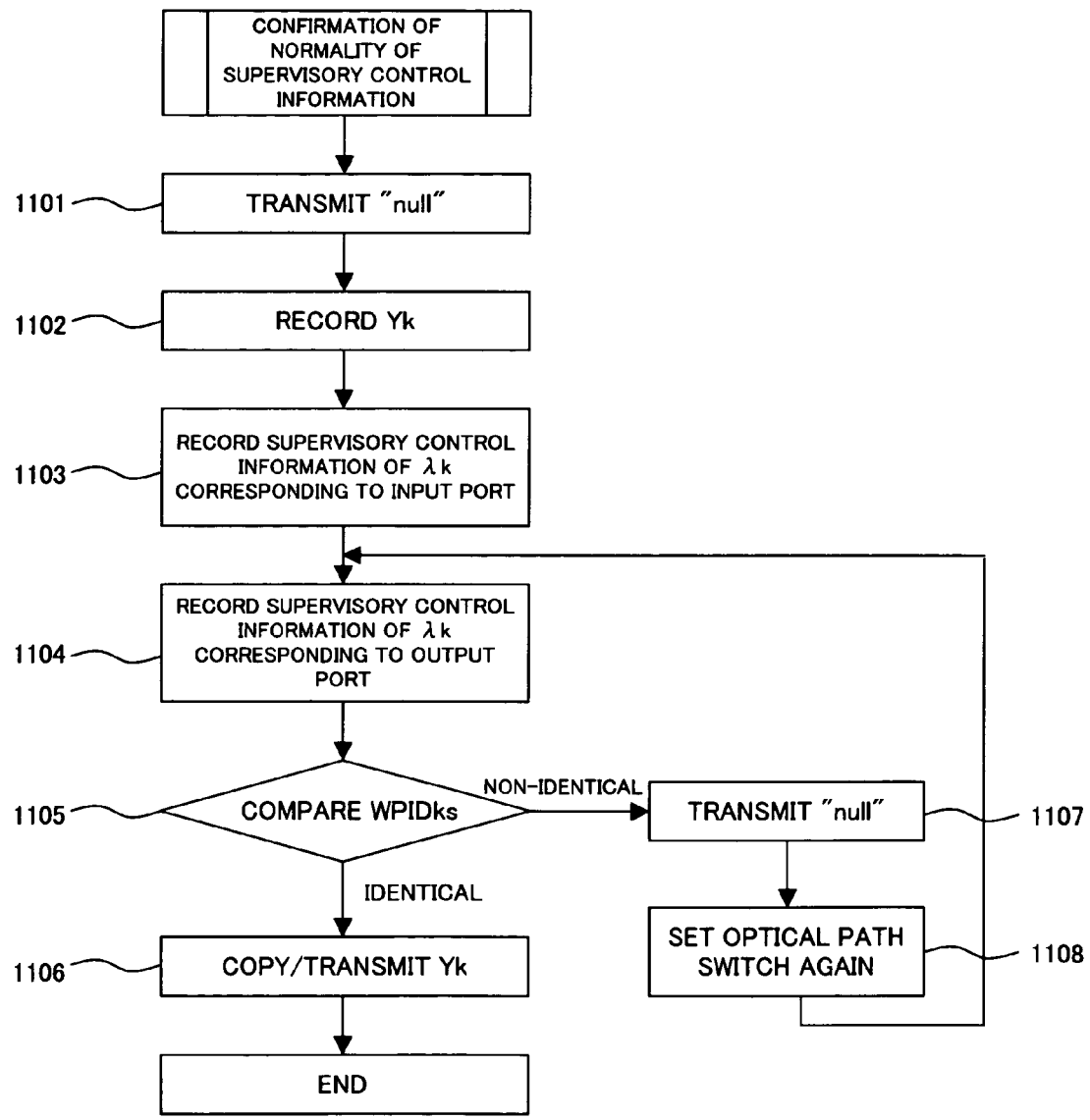
FIG. 11 is a flowchart for a third normality confirmation process.

FIG. 11 is a flowchart for the normality confirmation process of the supervisory control information in the EMS 601 in FIG. 10 (confirmation method 3). The controller 621 first sets "null" for specifying invalidity in the queue with the wavelength number k in the region 632-p (OSC-S#p-λk) corresponding to the output port #p, and outputs the "null" in the queue as the supervisory control information to the transmitter 612-p (step 1101). Thereby, the supervisory control information "null" is transmitted from the output port #p in accordance with the dedicated wavelength method.

Next, the supervisory control information Yk in accordance with the dedicated wavelength method in the wavelength path having the wavelength λk input to the memory management unit 623 from the receiver 609-m is stored in the queue with the wavelength number k in the region 631-m (OSC-R#m-λk) (step 1102).

Next, the supervisory control information in accordance with the main signal superposition method in the wavelength path having the wavelength λk input to the memory management unit 623 from the receiver 610-m is stored in the queue with the wavelength number k in the region 634-m (SC-Ri#m-λk) (step 1103).

Next, the supervisory control information in accordance with the main signal superposition method in the wavelength path having the wavelength λk input to the memory management unit 623 from the receiver 611-p corresponding to the output port #p is stored in the queue with the wavelength number k in the region 633-p (SC-Ro#p-λk) (step 1104).

WPIDk of the supervisory control information in the SC-Ri#m-λk is compared with WPIDk of the supervisory control information in the SC-Ro#p-λk (step 1105). When the above two WPIDks are identical to each other, the supervisory control information Yk in the OSC-R#m-λk is copied onto the OSC-S#p-λk, and the supervisory control information Yk in the OSC-S#p-λk is output to the transmitter 612-p (step 1106).

Thereby, the supervisory control information Yk which has been input together with the supervisory control information in accordance with the main signal superposition method is transmitted from the output port #p in accordance with the dedicated wavelength method at the timing when the supervisory control information in accordance with the main signal superposition method is transmitted from the output port #p. Accordingly, the supervisory control information Yk conforming with the supervisory control information in accordance with the main signal superposition method is output via the output port #p in accordance with the dedicated wavelength method.

When the above two WPIDks are not identical to each other, "null" is set in the OSC-S#p-λk and output as the supervisory control information to the transmitter 612-p (step 1107). Thereby, the supervisory control information "null" is transmitted from the output port #p in accordance with the dedicated wavelength method.

Next, the optical path switch 602 is again set so that the signal light in the wavelength path having the wavelength λk input from the input port #m is output to the path of the output port #p (step 1108), and the processes in the step 1104 and subsequent steps are repeated.

According to the above normality confirming process, when the supervisory control information on the input side of the optical path switch 602 in accordance with the main signal superposition method and the supervisory control information on the output side in accordance with the main signal superposition method do not correspond to each other, "null" is output to the transmitter 612-p, and when the above two information correspond to each other, the supervisory control information Yk is output to the transmitter 612-p. Accordingly, based on the confirmation of the transmission of the signal light corresponding to the supervisory control information Yk in accordance with the dedicated wavelength method, the corresponding supervisory control information Yk can be transmitted.

FIG. 12 shows the comparison between the conventional dedicated wavelength method/main signal superposition method with the method of transferring the supervisory control information according to the present invention. In FIG. 12, symbol 'O' means superior point, and symbol 'X' means inferior point.

In the dedicated wavelength method, signal light and supervisory control information have different wavelengths from each other so that the supervisory control information does not correspond to the light signal in a one-to-one manner. In this case, especially when switching the optical path for the signal light in the HUB node device, the operation for replacing the corresponding supervisory control information becomes complicated, so that the reliability of the supervisory control information is reduced.

In the main signal superposition method, the bit rate of the supervisory control information is low due to the characteristics of the method itself. For example, when the bit rate of the optical main signal is 10 Gbps and the bit rate of the supervisory control information is lower by eight places than the above bit rate of the optical main signal, the bit rate of the supervisory control information is at most 100 bps, which is not sufficient for transferring a great quantity of information such as a wavelength path ID, an address of destination node, a type of client format, signal quality information or the like.

Further, it is difficult to update the supervisory control information in the middle of the route for the wavelength path.

To the contrary, as the transference method according to the present invention, the method is employed in which the normality of the supervisory control information in accordance with the dedicated wavelength method is confirmed using a part of the supervisory control information in accordance with the main signal superposition method, by combining the above two transference methods. Accordingly, the supervisory control information and the optical main signal can be in correspondence to each other in a one-to-one manner while keeping the bit rate of the supervisory control information high. Further, the supervisory control information can be easily updated in the middle of the route for the wavelength path. Therefore, the transference of the supervisory control information which is excellent in the reliability, speed and flexibility is realized.

In the above embodiments, the methods of confirming the normality of the supervisory control information mainly in a HUB node device has been explained. However, the normality of the supervisory control information can be confirmed by the same methods also in other types of node devices such as a transmission terminal station, a reception terminal station, an OADM node device, an optical amplification relay device, or the like.

What is claimed is:

1. A method of transferring supervisory control information, the method comprising:
    wavelength division multiplexing supervisory control information, including wavelength path identification information for uniquely identifying each wavelength path in a network, on a dedicated wavelength and signal light obtained by superposing supervisory control information, including the same wavelength path identification information as in the supervisory control information on the dedicated wavelength, on an optical main signal of each wavelength path, and transferring an obtained wavelength division multiplexed signal;
    receiving first supervisory control information, including first wavelength path identification information of a first wavelength path and conformance information, multiplexed in a wavelength division multiplexed signal input from one of a plurality of input ports;
    extracting second supervisory control information, including second wavelength path identification information, superposed on an optical main signal of a second wavelength path from signal light to be multiplexed in a wavelength division multiplexed signal to be output from one of a plurality of output ports;
    comparing the first wavelength path identification information in the first supervisory control information and the second wavelength path identification information in the second supervisory control information when the conformance information in the first supervisory control information indicates that the first supervisory control information conforms with third supervisory control information, including the first wavelength path identification information, superposed on an optical main signal of signal light of the first wavelength path; and
    wavelength division multiplexing the first supervisory control information and signal light of the second wavelength path by using the first supervisory control information as supervisory control information on the dedicated wavelength when the first wavelength path identification information matches the second wavelength path identification information, and transmitting an obtained wavelength division multiplexed signal from the one of the plurality of output ports.

2. The method according to claim 1, further comprising:

searching fourth supervisory control information including the same wavelength path identification information as the second wavelength path identification information from a storage configured to store supervisory control information multiplexed in a plurality of wavelength division multiplexed signals input from the plurality of input ports when the first wavelength path identification information does not match the second wavelength path identification information; and wavelength division multiplexing the fourth supervisory control information and the signal light of the second wavelength path, and transmitting an obtained wavelength division multiplexed signal from the one of the plurality of output ports.

* * * * *